United States Patent
Kaneda et al.

(10) Patent No.: US 7,247,114 B2
(45) Date of Patent: Jul. 24, 2007

(54) AUTOMATIC TRANSMISSION

(75) Inventors: Takeshi Kaneda, Sagamihara (JP); Mitsumasa Yabutani, Shizuoka (JP); Hirofumi Maruyama, Fuji (JP)

(73) Assignees: JATCO Ltd, Shizuoka (JP); Unipres Corporation, Kanagawa (JP)

( * ) Notice: Subject to any disclaimer, the term of this patent is extended or adjusted under 35 U.S.C. 154(b) by 212 days.

(21) Appl. No.: 11/079,379

(22) Filed: Mar. 15, 2005

(65) Prior Publication Data
US 2005/0215374 A1    Sep. 29, 2005

(30) Foreign Application Priority Data
Mar. 24, 2004   (JP) .............................. 2004-087652

(51) Int. Cl.
*F16H 31/00* (2006.01)
(52) U.S. Cl. .................... 475/116; 475/146; 192/30 W; 192/85 AA; 192/87.11; 192/51
(58) Field of Classification Search ................ 475/116, 475/146; 192/30 W, 85 AA, 87.11, 51
See application file for complete search history.

(56) References Cited

U.S. PATENT DOCUMENTS 5,069,657 A * 12/1991 Taniguchi et al. .......... 475/283
5,388,474 A * 2/1995 Tanaka et al. ................ 74/434
5,865,289 A * 2/1999 Ishimaru ................... 192/87.11
2004/0094383 A1* 5/2004 Kinoshita et al. ........ 192/85 AA

FOREIGN PATENT DOCUMENTS

| JP | 59-009356 A | 1/1984 |
|----|-------------|--------|
| JP | 04-272563 A | 9/1992 |
| JP | 09-032918 A | 2/1997 |
| JP | 10-339368 A | 12/1998 |
| JP | 2001-090817 A | 4/2001 |

\* cited by examiner

*Primary Examiner*—David D. Le
(74) *Attorney, Agent, or Firm*—Foley & Lardner LLP

(57) ABSTRACT

A forward/reverse change-over mechanism (3) of an automatic transmission comprises a forward clutch (5) inside a drum (7) with the base (7c) which rotates together with an input shaft (1). The forward clutch (5) engages by driving a piston (9) housed in the drum (7) by the oil pressure of an oil chamber (10) between a base (7c) and the piston (9). Projecting bearings (16) which seat the piston (9) are formed by press-forming at equal angular intervals concentrically with the axial center of the drum (7) in the base (7c). By installing a sensor body (18) which responds to the passage of depressions (17) formed underneath the bearings (16), the forward/reverse change-over mechanism (3) can be made compact and manufactured with a small number of parts and machining steps.

7 Claims, 6 Drawing Sheets

AUTOMATIC TRANSMISSION

FIELD OF THE INVENTION

This invention relates to a sensor which detects the input rotation speed of a vehicle automatic transmission. This application claims priority from Japanese Patent Application 2004-087652, filed Mar. 24, 2004, which is incorporated herein by reference in its entirety.

BACKGROUND OF THE INVENTION

Concerning sensor arrangements which detect the input rotation speed of a vehicle automatic transmission, Tokkai Hei 09-32918 published by the Japan Patent Office in 1997 discloses a rotation speed sensor comprising members which extend in a radial direction at intervals of a fixed angle from a clutch drum, and a sensor body facing these members. The sensor body outputs a signal whenever a member passes a specific position on a path. The rotation speed of the clutch drum is detected from the interval of this signal.

SUMMARY OF THE INVENTION

According to the prior art, the sensor body is disposed outside the circumferential path of the member. Therefore, a space must be reserved for the sensor body outside the clutch drum, and the size of the automatic transmission in the radial direction increases correspondingly.

To avoid increasing the size of the automatic transmission in the radial direction, a rotation speed sensor is also known wherein a rotor is pressed into the outer circumference of the clutch drum from the axial direction, fixed by welding, and the rotation of the rotor is detected by a sensor installed behind the clutch drum.

This sensor requires a special rotor for detecting rotation speed, and as this rotor is fixed to the clutch drum by pressing and welding, the number of parts and machining steps required to install the input rotation speed sensor increase.

It is therefore an object of this invention to provide an input rotation speed sensor for an automatic transmission which is compact, and has few parts and machining steps.

In order to achieve the above object, this invention provides an automatic transmission which changes the rotation speed of an input shaft to output power. The transmission comprises a drum having a base which rotates together with the input shaft, a piston housed in the drum, and an oil chamber formed in the drum between the base and the piston. The piston displaces parallel to an axial center of the drum according to an oil pressure supplied to the oil chamber. The transmission further comprises plural projecting bearings which seat the piston formed at equal angular intervals concentrically with the axial center, depressions formed underneath the bearings, and a sensor body disposed facing the base which outputs a signal when the depressions pass by.

The details as well as other features and advantages of this invention are set forth in the remainder of the specification and are shown in the accompanying drawings.

DESCRIPTION OF THE PREFERRED EMBODIMENTS

Figure 1:
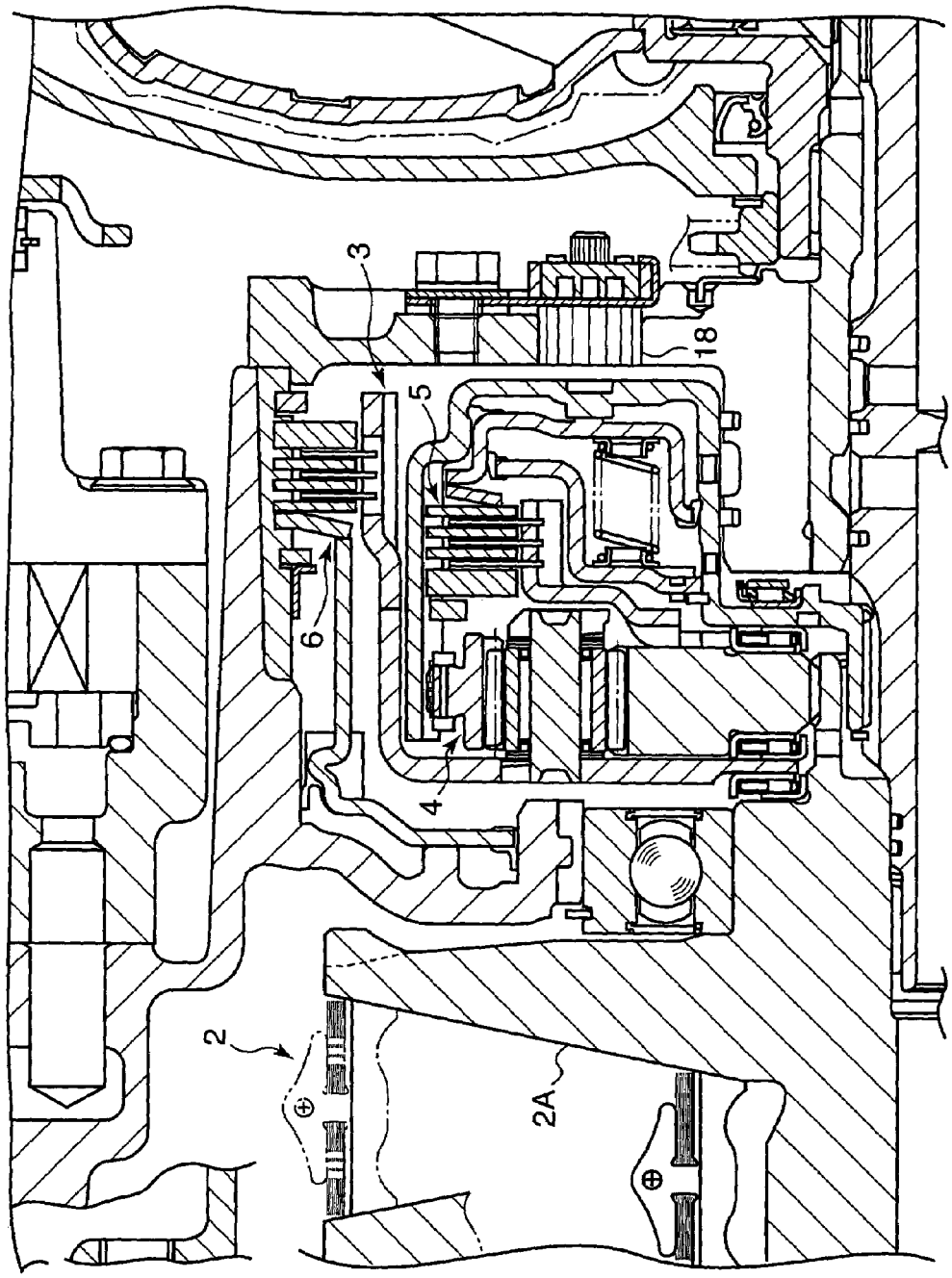
FIG. 1 is a vertical cross-sectional view of the essential parts of an automatic transmission according to this invention.

Referring to FIG. 1 of the drawings, a vehicle automatic transmission is provided with an input shaft 1 connected to an internal combustion engine, a V-belt continuously variable transmission mechanism 2 which changes the rotation speed of the input shaft 1, and a forward/reverse change-over mechanism 3 which changes over the direction of the rotation transmitted to the continuously variable transmission mechanism 2 from the input shaft 1.

The forward/reverse change-over mechanism 3 is disposed between the input shaft 1 and a primary pulley 2A of the continuously variable transmission mechanism 2.

The forward/reverse change-over mechanism 3 comprises a planetary gear set 4, a forward clutch 5 and a reverse clutch 6.

Figure 2:
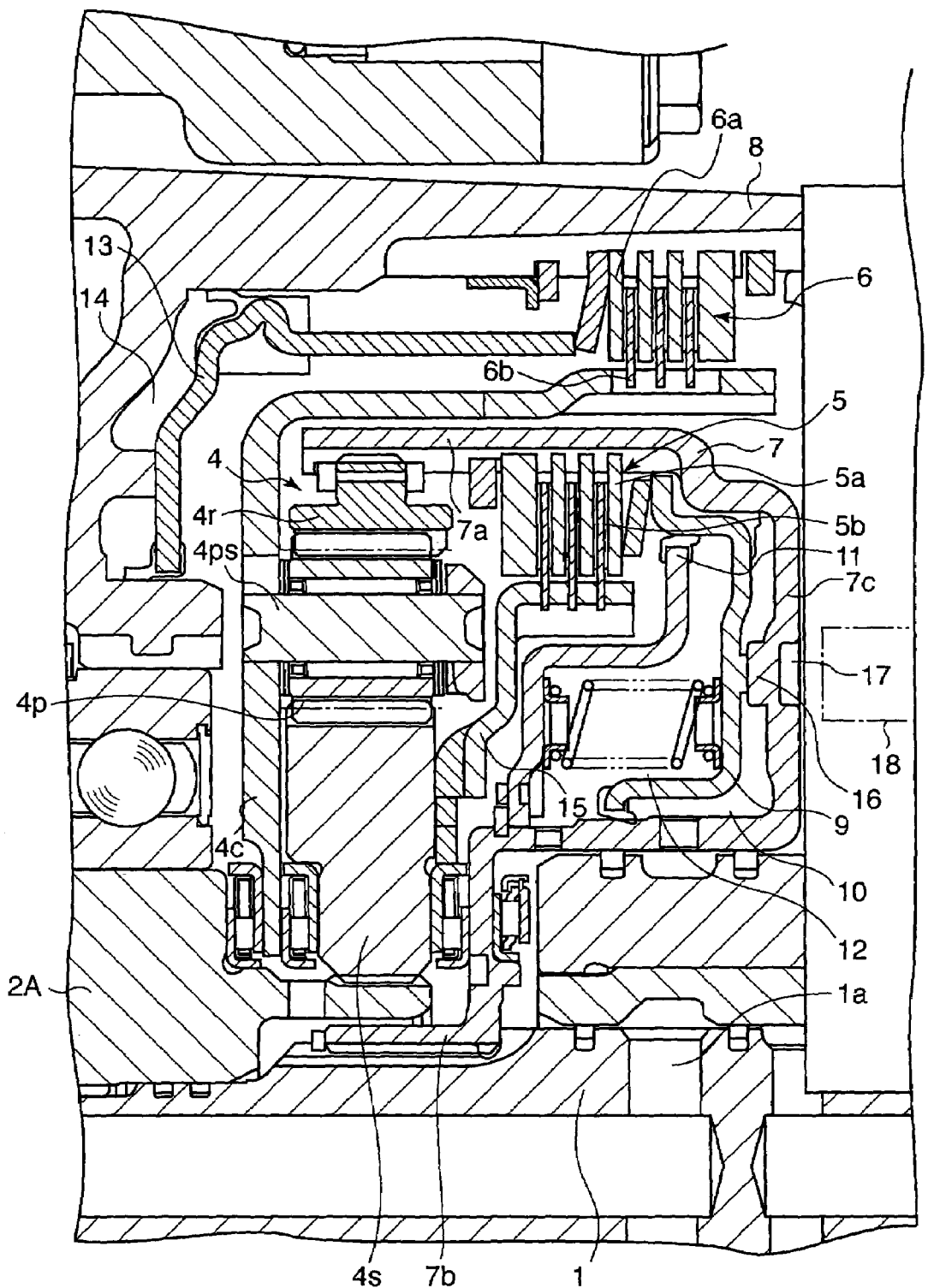
FIG. 2 is a vertical cross-sectional view of the essential parts of a forward/reverse change-over mechanism according to this invention.

Referring to FIG. 2, the planetary gear set 4 comprises a ring gear 4r, sun gear 4s, plural pinions 4p interposed between the sun gear 4s and ring gear 4r, and a planet carrier 4c supporting each rotation shaft 4ps of the pinions 4p.

The ring gear 4r is spline-jointed to the inner circumference 7a of a cylindrically-shaped forward clutch drum 7. A sleeve 7b is formed in the center of this forward clutch drum 7. The sleeve 7b is spline-jointed to the outer circumference of the input shaft 1.

The forward clutch 5 comprises a drive plate 5a and a driven plate 5b. The drive plate 5a is spline-jointed to the inner circumference 7a of the forward clutch drum 7. The driven plate 5b is fixed to a hub 15 formed in one piece with the sun gear 4s.

The drive plate 5a and driven plate 5b are laminated in the direction of the input shaft 1 to form a multi-plate clutch.

The inner circumference of the sun gear 4s is joined to the fixed primary pulley 2A of the continuously variable transmission mechanism 2.

The planet carrier 4c is constructed so that it can be connected to a case 8 of the automatic transmission via the reverse clutch 6. The reverse clutch 6 is also a multi-plate clutch identical to the forward clutch 5.

The inner circumference 7a of the forward clutch drum 7 and the sleeve 7b are joined via a base 7c. A piston 9 which presses the drive plate 5a parallel to the input shaft 1 is housed inside the forward clutch drum 7. An oil chamber 10 is formed between the piston 9 and base 7c of the forward clutch drum 7. The piston 9 displaces parallel to the input shaft 1 due to the oil pressure of the oil chamber 10, pushes the drive plate 5a against the driven plate 5b, and transmits the rotation of the input shaft 1 to the sun gear 4s by frictional force. An oil pressure is supplied to the oil chamber 10 via an oil passage 1a formed in the input shaft 1.

A hub 11 which slides on the inner circumferential surface of the piston 9 is fixed to the inside of the forward clutch drum 7. A spring 12 is interposed between the hub 11 and piston 9, and the piston 9 is pushed towards the base 7c parallel to the input shaft 1 by the reaction force of the spring 12.

When the forward clutch 5 is in the non-engaged state, the oil pressure of the oil chamber 10 is released, and the piston 9 is held in a retracted position by the pushing force of the spring 12.

The reverse clutch 6 comprises a drive plate 6a, a driven plate 6b and a piston 13 which pushes the drive plate 6a.

An oil chamber 14 is formed between a piston 13 and case 8. The piston 13 displaces parallel to the input shaft 1 due to the oil pressure of the oil chamber 14, pushes the drive plate 6a against the driven plate 6b, and restricts the rotation of the planet carrier 4c by frictional force. When the oil pressure of the oil chamber 14 is released, the piston 13 is pushed by a spring, not shown, and is held in a retracted position which releases the reverse clutch 6.

Due to the aforesaid construction, when the forward/reverse change-over mechanism 3 engages the forward clutch 5 and releases the reverse clutch 6, the ring gear 4r, sun gear 4s and planet carrier 4c rotate together so that the rotation of the input shaft 1 is transmitted to the primary pulley 2A without changing direction. On the other hand, when the forward clutch 5 is released and the reverse clutch 6 is engaged, the planet carrier 4c is restricted, so the ring gear 4r and sun gear 4s rotate in opposite directions, and the rotation of the input shaft 1 is transmitted to the primary pulley 2A in the reverse direction.

Next, the main construction of the rotation speed sensor which is the subject matter of this invention, will be described.

Figure 3:
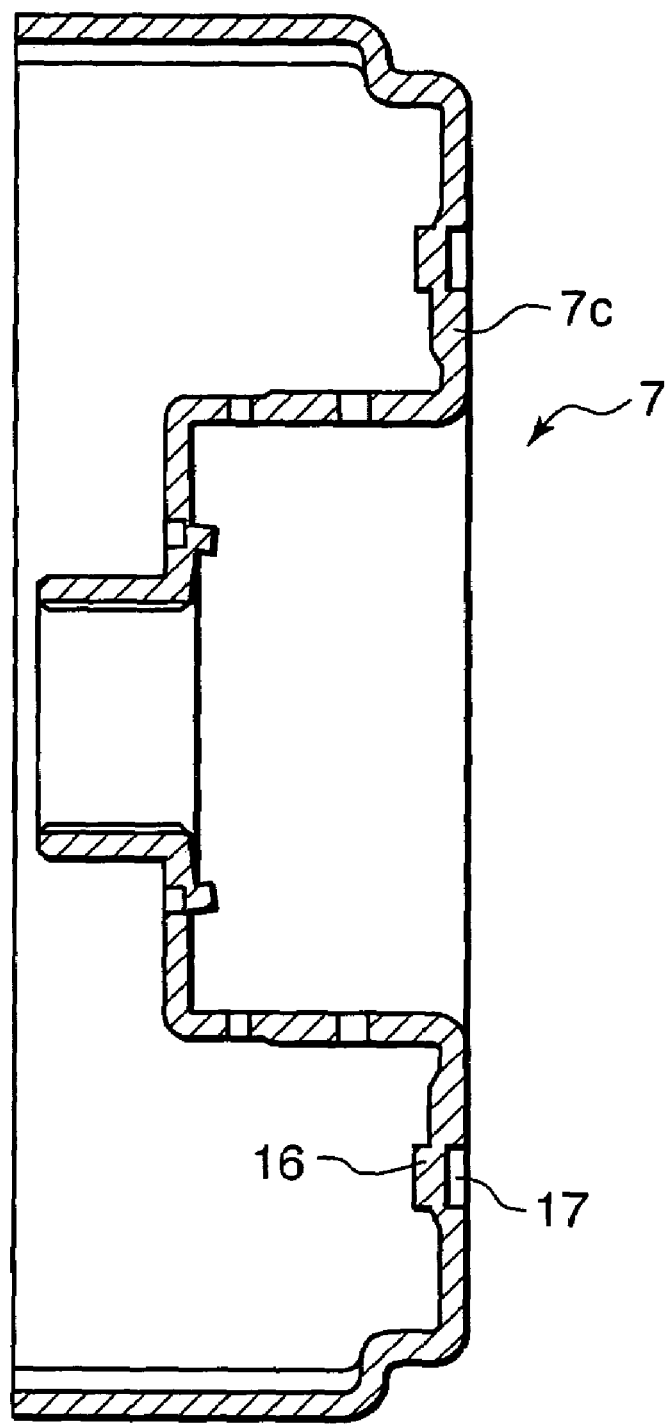
FIG. 3 is a vertical cross-sectional view of a forward clutch drum according to this invention.

Referring to FIG. 3, the forward clutch drum 7 comprises plural bearings 16 which seat the piston 9 in a retracted position on the base 7c. The bearings 16 are projections extending toward the piston 9, and are formed at a constant angular interval on a circle having the input shaft 1 at its center. The height of the bearing 16 is set according to a design oil amount of the oil chamber 10.

Figure 4:
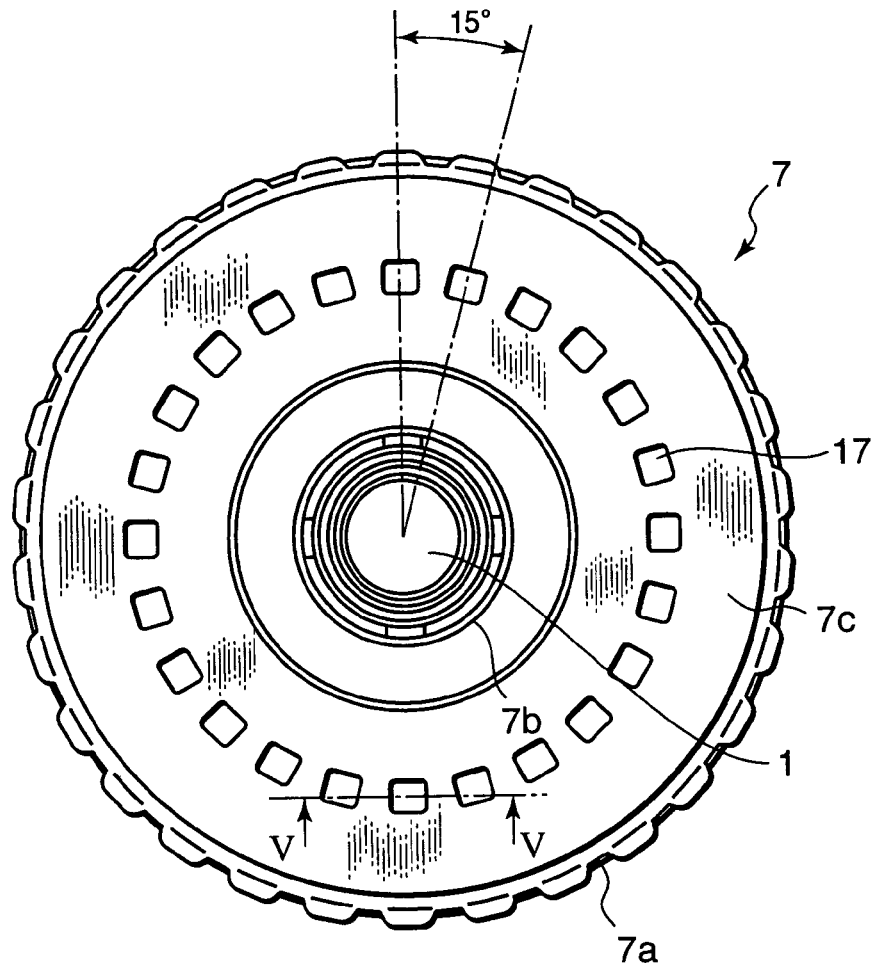
FIG. 4 is a rear elevation of the forward clutch drum.
Figure 5:
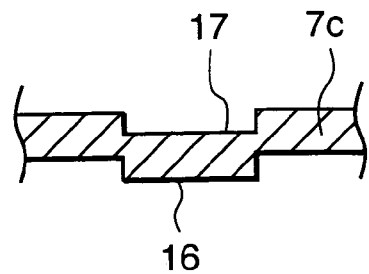
FIG. 5 is a vertical cross-sectional view of a bearing surface and a depression taken along a line V-V in FIG. 4.

Depressions 17 corresponding to the bearings 16 are also formed in the rear surface of the base 7c. Referring to FIG. 4, a total of 24 sets of the bearings 16 and depressions 17 are formed in the base 7c having the input shaft 1 at its center. Referring to FIG. 5, the depth of the depressions 17 is equal to the height of the bearings 16. The bearings 16 and depressions 17 are formed in one piece by press-forming.

Referring again to FIG. 2, a sensor body 18 is disposed facing the path of the depressions 17 which rotate together with the rotation of the forward clutch drum 7.

The sensor body 18 outputs a signal when the depressions 17 pass by them, and detects the rotation speed of the forward clutch drum 7 based on the signal interval.

The sensor body 18 is generally formed in a cylindrical shape. By placing the sensor body 18 in the path of the depressions 17 parallel to the input shaft 1, the sensor body 18 need not be installed outside the forward clutch drum 7 with respect to the radial direction, so the dimensions of the automatic transmission or forward/reverse change-over mechanism 3 in the radial direction can be suppressed small.

Referring to FIGS. 6A-6D, the method of forming the bearings 16 and depressions 17 in the forward clutch drum 7 will now be described.

Figure 6A:
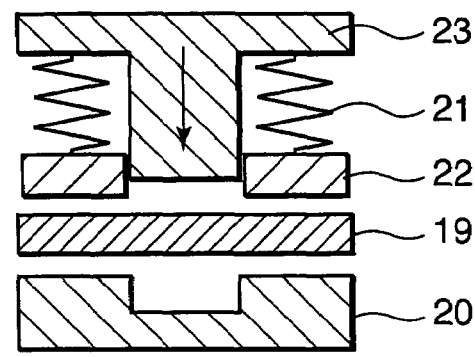
FIGS. 6A-6D are diagrams describing a press process of the bearing surface and the depression.
Figure 6B:
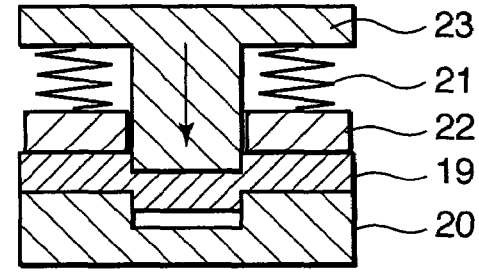

A steel plate 19 is set in a die 20, and the steel plate 19 is fixed by a flat clamp 22 elastically supported by a spring 21. The steel plate 19 is then pressed by a punch 23 until the depressions 17 of predetermined depth are formed in the steel plate 19 as shown in FIG. 6B.

Figure 6C:
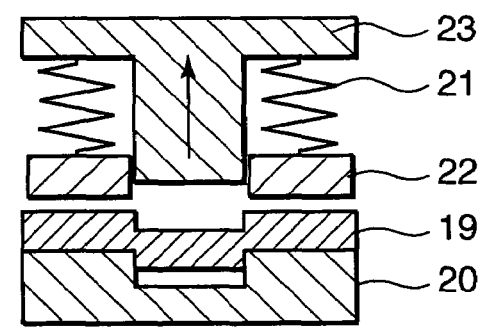
Figure 6D:
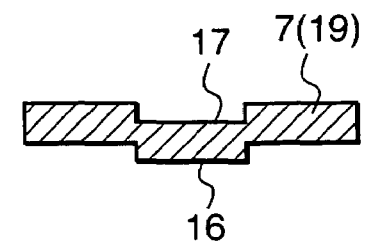

Subsequently, the punch 23 and flat clamp 22 are removed as shown in FIG. 6C, and the bearings 16 and depressions 17 underneath them are formed in one piece with the forward clutch drum 7 as shown in FIG. 6D.

Figure 7:
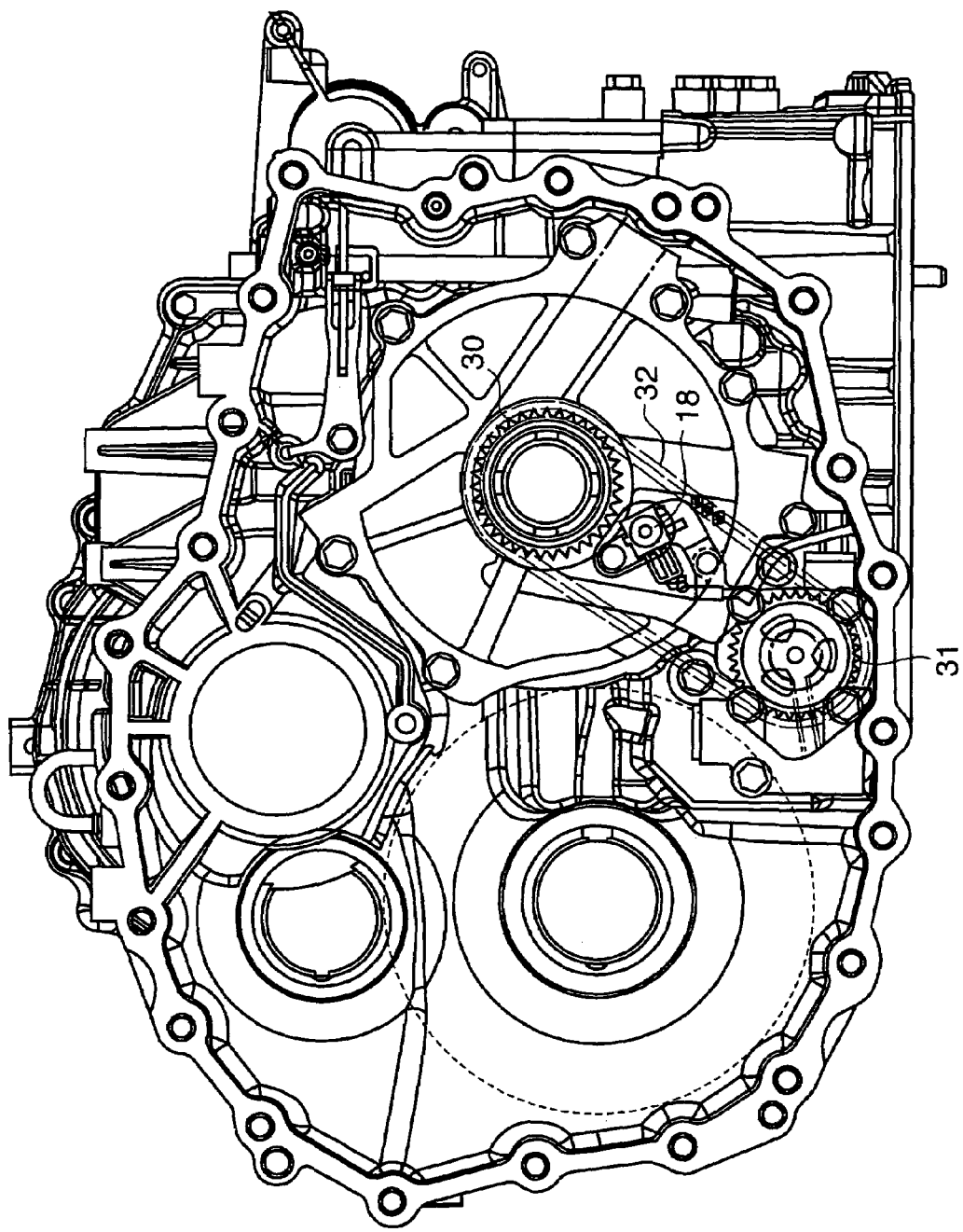
FIG. 7 is a rear elevation of the automatic transmission describing the spatial relationship of the sensor body according to this invention, and a chain which drives an oil pump.

Next, referring to FIG. 7, the sensor body 18 is installed on the inner side of a chain 32 looped around a sprocket 30 fixed to the rotation axis of the primary pulley 2A, and a sprocket 31 which drives an oil pump, in the vicinity of the rotation axis of the primary pulley 2A.

As described hereinabove, the rotation speed sensor according to this invention does not comprise a rotor outside the forward clutch drum 7, and the passage of the depressions 17 in the base 7c of the forward clutch drum 7 is detected by the sensor body 18. The forward/reverse change-over mechanism 3 can therefore be made more compact with respect to the radial direction.

Further, the bearings and 16 and depressions 17 are formed in a one-piece construction, so machining and assembly steps are reduced, and the rotation speed sensor can be incorporated in the automatic transmission at low cost. As the depressions 17 are formed in one piece with the bearings 16, the formation of the depressions 17 has no effect on the volume of the oil chamber 10, so sufficient oil pressure can be made to act on the piston 9.

The contents of Tokugan 2004-101055, with a filing date of Mar. 30, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, herein, an embodiment was described where this invention was applied to an automatic transmission comprising the V-belt continuously variable transmission mechanism 2, but this invention may be applied also to an automatic transmission comprising a conventional automatic transmission mechanism that varies the rotation speed of the input shaft 1 through plural combinations of gears.

What is claimed is:

1. An automatic transmission which changes a rotation speed of an input shaft to output power, comprising:
    a drum having a base which rotates together with the input shaft;
    a piston housed in the drum;
    an oil chamber formed in the drum between the base and the piston, the piston displacing parallel to an axial center of the drum according to an oil pressure supplied to the oil chamber;
    plural projecting bearings formed on the base at equal angular intervals concentrically with the axial center to seat the piston;
    depressions formed underneath the bearings; and
    a sensor body disposed facing the base which outputs a signal when the depressions pass by.

2. The automatic transmission as defined in claim 1, wherein the bearings and depressions are formed in one piece by press-forming.

3. The automatic transmission as defined in claim 1, wherein a longitudinal axis of the sensor body is disposed parallel to the axial center of the drum.

4. The automatic transmission as defined in claim 1, wherein the sensor body has a cylindrical form, wherein a longitudinal axis of the sensor body is disposed parallel to the input shaft.

5. The automatic transmission as defined in claim 1, wherein the automatic transmission comprises a transmission mechanism which varies a rotation speed of the input shaft, and a forward/reverse change-over mechanism which is disposed between the input shaft and the transmission mechanism and changes over a rotation direction of the input shaft, wherein the forward/reverse change-over mechanism comprises a planetary gear set comprising a sun gear joined to the transmission mechanism and a ring gear joined to the input shaft, a forward clutch configured to force the sun gear and ring gear to rotate in the same direction, and a reverse clutch configured to force the sun gear to rotate in an opposite direction of the ring gear, and wherein the piston forms part of the forward clutch.

6. The automatic transmission as defined in claim 5, wherein the forward clutch is constructed so as to permit the sun gear to rotate in the opposite direction of the ring gear when the piston is seated in the bearings.

7. The automatic transmission as defined in claim 6, wherein the forward clutch further comprises a spring configured to push the piston towards the bearings.

* * * * *